US008296721B2

(12) United States Patent
Sivaram

(10) Patent No.: US 8,296,721 B2
(45) Date of Patent: Oct. 23, 2012

(54) TEMPLATE-BASED SOFTWARE DEVELOPMENT

(75) Inventor: Rajini Sivaram, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 12/115,668

(22) Filed: May 6, 2008

(65) Prior Publication Data

US 2008/0301626 A1 Dec. 4, 2008

(30) Foreign Application Priority Data

May 30, 2007 (EP) .................................... 07109237

(51) Int. Cl.
 *G06F 9/44* (2006.01)
(52) U.S. Cl. ........................................................ 717/104
(58) Field of Classification Search ........................ None
See application file for complete search history.

(56) References Cited

U.S. PATENT DOCUMENTS 7,197,740 B2 * 3/2007 Beringer et al. ............... 717/108
2004/0044987 A1 * 3/2004 Kompalli et al. ............. 717/100
2005/0055667 A1 * 3/2005 Beringer et al. ............... 717/108
2005/0071805 A1 * 3/2005 Lauterbach et al. .......... 717/104
2007/0150882 A1 * 6/2007 Pena et al. ..................... 717/168
2008/0276229 A1 * 11/2008 Hawkins et al. ............... 717/136

OTHER PUBLICATIONS

Matusiak et al, "Model-driven development using XDE patterns: Case study," (2004).

* cited by examiner

*Primary Examiner* — Philip Wang
(74) *Attorney, Agent, or Firm* — Fox Rothschild, LLP; Robert J. Sacco

(57) ABSTRACT

A computer-implemented method for software development includes selecting a pre-defined software pattern, the pre-defined software pattern having one or more pre-defined elements, identifying one or more of the pre-defined elements to be modified, obtaining one or more behavioral models, each of the behavioral models specifying a functional behavior for at least one of the identified elements, ascertaining a modification required for each of the identified elements to provide the specified functional behavior, and incorporating the modification into an instance of the software pattern.

20 Claims, 3 Drawing Sheets

TEMPLATE-BASED SOFTWARE DEVELOPMENT

CROSS REFERENCE TO RELATED APPLICATIONS

The present application claims the benefit of United Kingdom Application No. 07109237.3 entitled "A METHOD OF GENERATING SOURCE CODE", filed on May 31, 2007, which is incorporated by reference in its entirety into the present application.

FIELD OF THE INVENTION

The present invention relates to the field of software development, and more particularly software development using templates.

BACKGROUND

Software development using patterns has become increasingly popular. In particular, pattern use in software development improves productivity by automating application development and promoting reuse of existing code. Typically, Software development using software patterns relies on the use of code generation programs which convert the software patterns to an actual implementation in computer code. In some cases, a pattern can be defined by a template, indicating that different options are available for the pattern. However, code generation programs encountering such template-defined software patterns typically require that all possible options for the template be precisely defined at the time of code generation. This can restrict the amount of customization possible to only that known at the time the template is generated. This can complicate any subsequent customization of an application generated from the patterns.

In these instances, application customization can generally only be implemented either using an extension to the code generation program or by modifying the final code generated from the pattern. Both of these solutions have drawbacks. Extension of code generation programs is often difficult for application programmers. In particular, this generally requires a complete understanding of how to build code generation programs as well as a complete understanding of the implementation of the code generation program to be modified. Modifying generated code is simpler than extending the code generation program, but the advantages of the automated development process (e.g., generating code for multiple languages, higher level of abstraction, etc.) are lost.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

In a first embodiment of the present invention, a computer-implemented method for software development is provided. The method includes selecting a pre-defined software pattern, said pre-defined software pattern having one or more pre-defined elements, identifying one or more of said pre-defined elements to be modified, obtaining one or more behavioral models, each of said behavioral models specifying a functional behavior for at least one of said identified elements, ascertaining a modification required for each of said identified elements to provide said specified functional behavior, and incorporating said modification into an instance of said software pattern.

In a second embodiment of the present invention, a system for developing computer programs is provided. The system includes at least one storage element configured for storing a pre-defined software pattern, said pre-defined software pattern having one or more pre-defined elements, and at least one a processing element. The processing element is configured for identifying one or more of said pre-defined elements to be modified, obtaining one or more behavioral models, each of said behavioral models specifying a functional behavior for at least one of said identified elements, ascertaining a modification required for each of said identified elements to provide said specified functional behavior, and incorporating said modification into an instance of said software pattern.

In a third embodiment of the present invention, a computer-readable storage, having stored thereon a computer program for software development is provided. The computer program includes a plurality of code sections executable by a computer to cause the computer to perform the steps of: selecting a pre-defined software pattern, said pre-defined software pattern having one or more pre-defined elements; identifying one or more of said pre-defined elements to be modified; obtaining one or more behavioral models, each of said behavioral models specifying a functional behavior for at least one of said identified elements; ascertaining a modification required for each of said identified elements to provide said specified functional behavior; and incorporating said modification into an instance of said software pattern.

DETAILED DESCRIPTION OF THE DRAWINGS

Figure 1:
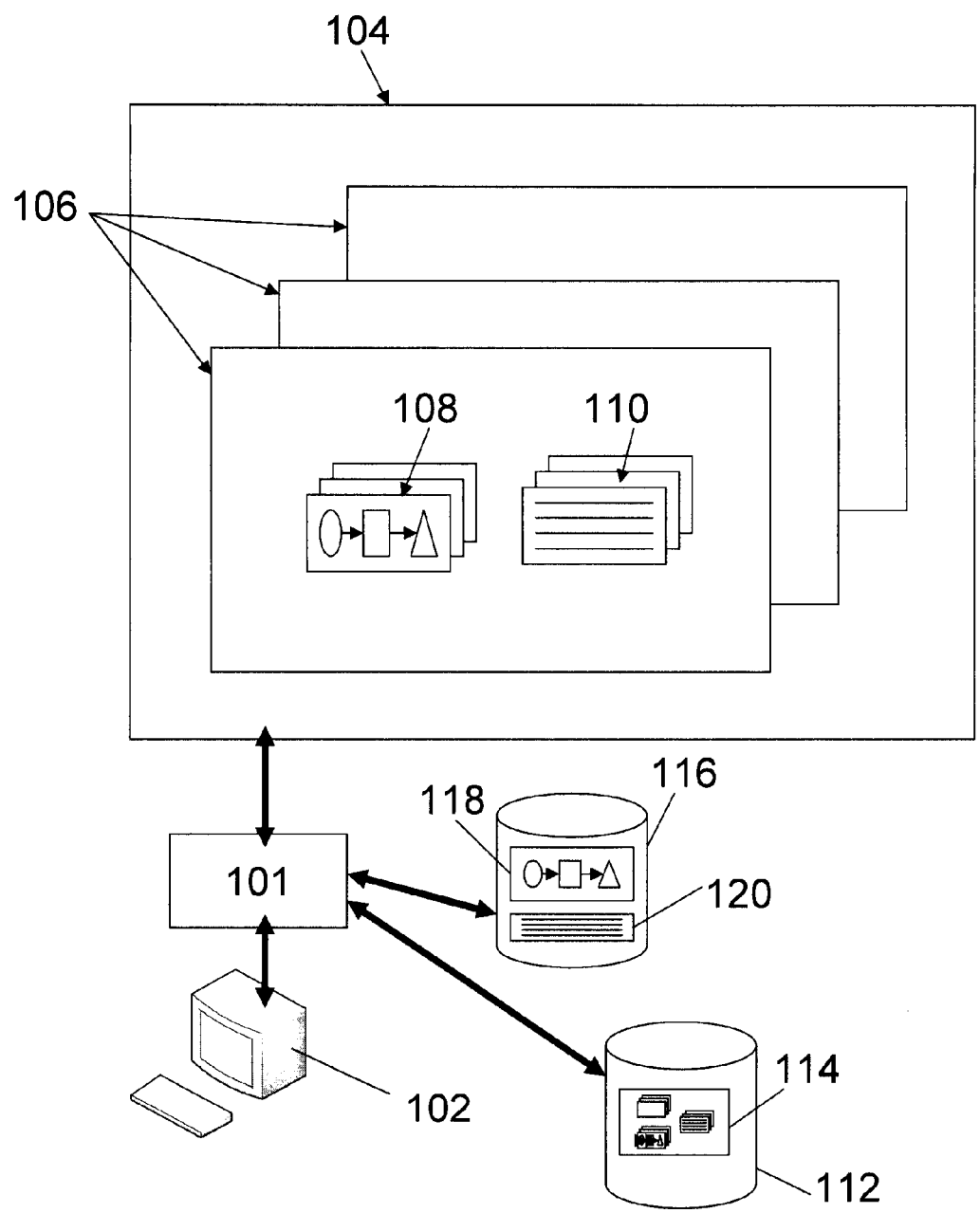
FIG. 1 is a schematic view of an exemplary software development and customization environment according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As previously described, one of the major limitations of template-based software development is the need to have a full knowledge for all possible options for the template. That is, all possibilities for the software pattern must be described within the template. Accordingly, any customization beyond these options specified in the template require reconfiguring the template or the code generating program, or require customization of the final code generated. All of the foregoing actions require extensive programming knowledge and/or techniques to perform the desired customization.

However, the inventor has discovered that pattern-based methods, and in particular, template-based methods of software development can be combined with model-based software development methods to provide customization of software patterns without the need for advanced programming. In particular, embodiments of the present invention provide systems and methods for developing customized computer programs by applying behavioral models to software patterns. Thus, the software patterns can be used to generate the overall structure of the computer program and behavioral models can be used to implement specific or customized functionality within the computer program generated from software patterns.

In particular, embodiments of the present invention provide for implementing the software patterns using pre-defined templates which can be modified by behavioral models. In other words, the pre-defined templates define software patterns with default functionality. For example, a template for a software pattern can define a default configuration for each object, property, or other element within a software pattern.

Typically, these templates can be implemented using a pattern development tools such as the Rational Software Architect (RSA) developed by International Business Machines (IBM). RSA is built on the Eclipse open-source software framework and includes capabilities focused on architectural code analysis and model-driven development (MDD) using the Unified Modeling language (UML) for creating applications. That is, the application framework can be constructed using models or templates for objects, including objects specified using a UML model. Pattern development tools can then generate the default configuration for any elements in a selected template or pattern using a pattern plug-in to convert the default configuration to actual code, such as a Java Emitter Template (JET). However, these existing pattern development tools still generally fail to provide a direct or otherwise convenient means for providing customization of the patterns used to generate the code.

For example, UML modeling features of existing pattern development tools, such as RSA, enable the generation of code from UML-based models, such as class diagrams, sequence diagrams, and activity diagrams. The pattern-based development features then enable the definition of patterns or templates using the model elements as classes or elements in the coded software pattern. However, the code generation programs provided with such pattern development tools for pattern-based development generally use such UML models only for generating structural information of the application, i.e., the general framework for the application being developed. Therefore the code generated by code generation programs in existing pattern development tools is purely based on the default information in templates, as existing code generation programs for templates are not configured to generate code outside this basic framework defined by the templates.

In contrast, the present invention provides for the code generation program to modify the default configuration for the elements during code generation by going beyond the generation of the framework and applying a behavioral models specifying the custom behaviors for the elements specified in the templates. That is, aside from any templates or models used to generate the framework, the code generation program is further configured to go one step further. Namely, to analyze and generate code from an additional layer of behavioral models provided for one or more of the templates in the framework, and thus provide any needed customization of the generated code. For example, additional plugins or extensions to RSA or other pattern development tools can be provided to extend the standard configuration of the code generation programs therein. In particular, the extensions can specify to the code generation program to combine the pattern-based framework with the behavioral models to generate the customized code. Therefore, rather than requiring customization of the code generation program or the final generated program code each time a customization is needed, the behavioral models for the templates to be modified are provided as an additional inputs for the code generation program, which can then override or modify the default configuration set forth in the templates.

In the various embodiments of the present invention, behavioral models can be expressed in several ways. For example, a behavioral model can be expressed as a sequence of steps or actions which describe the interaction between the objects in a system in the order in which these interactions occur. In another example, a behavioral model can be expressed as a group of activities that describe a procedural flow of the actions that describe the behavior being modeled, along with the events that trigger these actions. In yet another example, a behavioral model can be expressed using states and state transitions, which describe the states of each object in the system and events that trigger transitions from one state to another.

Although behavioral models can be expressed and generated in many ways, one aspect of the present invention is to provide behavioral models that preserve the advantages of model-driven development, such as multi-platform support and high level abstraction. Therefore, in the various embodiments of the present invention, a general purpose modeling language, such as the Unified Modeling Language (UML), can be used to generate abstract behavioral models. That is, rather than requiring the desired behavior for the software pattern to be expressed using the notation of a particular programming language, which can limit its use, the desired behavior can instead be expressed as an abstract model using constructs that are common to most programming languages. For example, the behavioral model can be expressed using the basic graphical notation of UML. In some cases, extensions or plug-ins can be provided for pattern-based development tools not supporting model-based languages. Alternatively, existing programming capabilities of pattern development tools supporting programming using model-based languages can also be used. For example, RSA, as previously described, supports programming using UML.

The behavioral models can be expressed using sequence, activity, and/or state diagrams. This abstract model can then be directly converted into the code sections for a computer program. Accordingly, by using general purpose modeling languages, the behavioral models can be generated using less complex and platform independent object-based methods, reducing or eliminating the complexity typically required for computer program customization.

An exemplary system for software development 100 is shown in FIG. 1. The development system 100 can include a processing element and at least one user interface 102 for managing the software development process and a working memory or storage element 104. In the various embodiments, the development system 100 can comprise a computer system, as described below. The working memory 104 can be used to construct and store a user's current computer program project. That is, the working memory 104 can store the various software patterns 106 being used for generating a computer program.

A software pattern 106 can be used to specify various types of functionality to include in the computer program. Furthermore each software pattern can include one or more elements, such as objects 108 and properties 110. Objects 108 can include any tasks or operations to be executed by the generated code associated with the pattern 106. Properties 110 can include any values or parameters required for operation of the computer program. However, the invention is not limited in this regard and other types of elements can also be included within the software patterns. For example, objects 108 and properties 110 can be domain specific. That is, the objects 108 and properties 110 included in a software pattern 106 can vary according to the domain the software pattern 106 is implemented in. In the various embodiments of the invention, a software pattern 106, including object elements 108, property elements 110, and other elements, can be generated by a user via the user interface 102. However, the invention is not limited in this regard and software patterns 106, can also be automatically generated for the project in working memory 104. In particular, some embodiments of the present invention can provide a template database 112 for storing pre-defined templates 114 for software patterns 106. As previously described, the templates 114 include default configurations for objects 108 and properties 110. Additionally, some embodiments of the present invention can also include an element database 116 for storing pre-defined behavior models 118 and other pre-defined values for elements 120. In the various embodiments of the invention, the behavior models 118 and the other pre-defined values 120 can be used to modify the patterns 106 in the working memory 104 prior to code generation.

Figure 2:
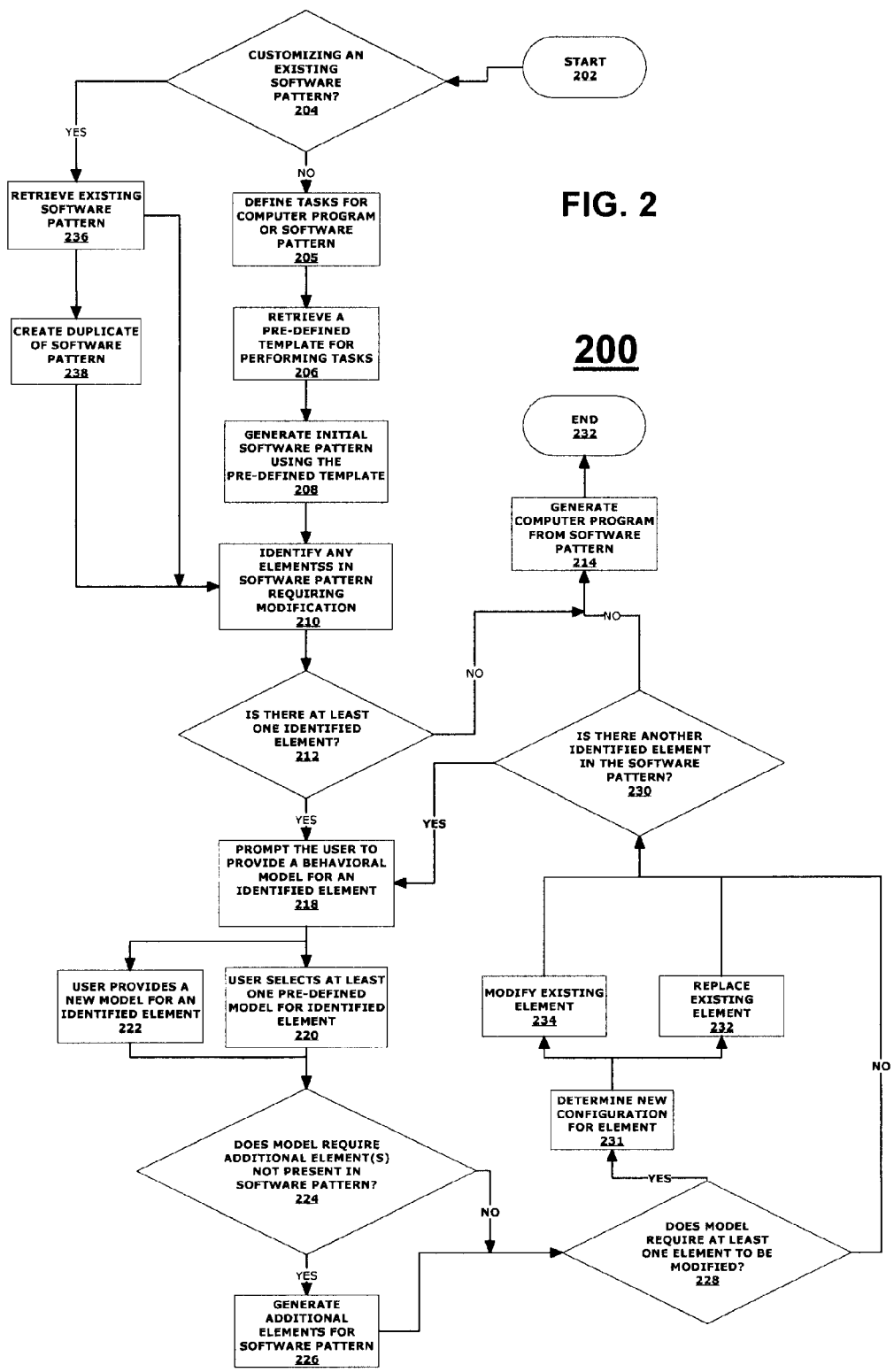
FIG. 2 is a flowchart of steps in an exemplary method for software development and customization according to an embodiment of the present invention.

FIG. 2 illustrates an exemplary method 200 development of computer programs according to an embodiment of the present invention. The method 200 can start in step 202 and continue to step 204. In step 204, a development system makes a determination as to whether the user wishes to customize an existing computer program or software pattern. If the user wishes to create a new software pattern or computer program, the method 200 can continue to step 205. Consequently, in step 205, a user can define the properties for the computer program. That is, a user can define the functionality required or the task(s) to be accomplished by the final computer program generated by the development system 100.

Alternatively or in combination with step 205, the development system can retrieve one or more pre-defined templates for the computer program. That is, based on the task(s) specified in step 205, the development system can retrieve one or more templates associated with software patterns for accomplishing the task(s). For example, in the case of a messaging computer program being developed for a user, a software pattern can be selected that defines a message consumer. However, the invention is not limited solely to the generation of messaging programs, rather the methods described herein can be used for generating any type of computer program or application.

As previously described, the development system can automatically retrieve templates from a template database. For example, an automated application development system can recognize the tasks specified in step 205 and automatically select templates associated with the software patterns required to implement the tasks. The development system can then access a template database, as previously described, and retrieve the appropriate template for the required software pattern. However, in some cases, the user need not define the tasks to be accomplished and can directly request a particular software pattern. For example, referring to the message consumer example above, the user may already know which software pattern to select. Alternatively, the user may wish to use a particular template for the necessary software pattern. For example, the user can select a template different from the one that would normally be automatically selected by an automated application development system in response to the task(s) defined. Once the template has been retrieved in step 206, the development system in step 208 can generate an initial version of the software pattern to be used, based on the retrieved template. As previously discussed, the template can define a default configuration for the software pattern, including default configurations for any elements of the software pattern.

The initial version of the software pattern generated in step 208 can provide a fully functional computer program, albeit using only a default configuration. However, in the various embodiments of the present invention, the user may wish to alter the software pattern for a particular application. For example, in the case of the message consumer, the software pattern may contain several elements, such as routing information, a communication mode for the message consumer, and consumer message processing object. For a particular application, one or more of these elements may require some customization or modification.

If the software pattern generated in step 208 requires customization, the elements to be customized can be identified in step 210. For example, although the template can be configured to provide default values for elements, the development system can generate a list of these elements for the user to select which ones to modify. Alternatively, once the software pattern is generated, the user can review the resulting pattern and identify to the development system any elements requiring modification. In other cases, the template can have a null configuration for an element. That is, any code generated by the default configuration of the software pattern will allow the computer program to operate, but will only have placeholder code for the null elements. In such cases, the development system can be configured to identify these null elements and automatically identify them for customization.

Once the elements to be modified are identified in step 210, customizations are applied starting in step 212. First, in step 212, the development system can determine whether any customizations have been identified. For example, in some cases, the user may wish to use the default configuration and may choose not to make any modifications. Therefore, the software pattern can be immediately converted to a final computer program using a code generation program in step 214 and the method can end in step 216. However, if at least one modification or customization of an element of the software pattern is required, the method 200 can proceed to step 218.

In step 218, the system can prompt the user to provide a behavioral model for an element identified in step 210. In the various embodiments, the user can provide the behavioral model in several ways. First, as shown in step 220, the user can select a pre-defined behavioral model from an element database, as previously discussed. Alternatively, as shown in step 222, the user can generate a new behavioral model via a user interface. However, the invention is not limited in this regard, and in some embodiments, the user can select an existing model from the element database and customize or modify it prior to submission to the development system. As previously discussed, the models can be provided to the development system in a general purpose modeling language notation. However, the invention is not limited in this regard, and in some embodiments, the user can provide models in other languages or can directly provide the necessary code for the particular element to be modified.

After the model has been provided for the object or element in steps 220 or 222, the development system can then analyze the model provided in step 224 and determine whether new functionality has been introduced by the submitted model. That is, whether the model requires additional elements not currently present in the software pattern. Accordingly, this can require not only customization of the default configuration of existing elements, but can also require the creation of new elements within the software pattern. As a result, if such new functionality is detected in step 224, the software development system can generate and configure the new elements in step 226.

After the new elements are generated in step 226 or if no extended functionality has been identified in step 224, the method 200 can proceed to step 228. In step 228, the development system can determine whether the model calls for modifying an element or property. For example, if a user specifies a model and the default configuration of an object is to provide the same functionality, then no modification is necessary. In another example, if new elements are generated in step 226, but the model specifies no changes for the existing elements, then again no modification is necessary. In either case, the method can proceed to step 230.

However, if the development system determines in step 228 that modification of an existing element in the software pattern is necessary, the existing elements can be modified. First, in step 231, the modifications for the element can be determined. Based on these proposed modifications, the element can be modified. For instance, as shown in step 232, the default configuration of the software pattern can be simply replaced. That is, the model can be used to generate a new version of the element and can be used to replace the existing version of the element within the software pattern. Alternatively, the default configuration can be modified. That is, the software development system can simply modify the existing element. However, the invention is not limited in this regard and in some cases the development system can make a determination of which method is best for a particular circumstance. For example, in the case of a complex element that has readily identifiable portions, only the portions that require modification can be replaced or updated. However, different types of elements can be updated or modified differently. For example, since properties generally define parameters and values used by various objects within the software pattern, the development system can be configured to always replace them. In contrast, because objects may only be slightly modified or extended by the submitted model, the development system can analyze the existing object and determine where modifications need to be made. Such a configuration can help ensure that the objects are correct adapted for the particular software pattern or that object changes are limited After all modifications of a particular element are completed in steps 232 or 234, the method 200 can proceed to step 230. In step 230, the system can then determine if all modifications have been completed by determining whether any identified elements still need to be modified. If an additional element still needs modification, the method 200 can repeat steps 218 through 234 for the remaining elements. Once all elements in the software pattern have been modified, the method can proceed to step 214 and the computer program can be generated from the software pattern. The method 200 can then end in step 216.

However, the invention is not limited solely to the generation of new computer programs and can also be applied to modification or customization of existing computer programs and software patterns. In the case of an existing computer program, a software pattern has already gone through some initial customization and has typically been stored. Accordingly, if a user selects to customize an existing computer program in step 204, the method 238 can first retrieve the associated software pattern in step 238. That is, the modified software pattern is used as a template. Accordingly, the previously modified software pattern can be stored in and retrieved from a template database. In some embodiments, it can be desirable to store an archive copy of the original modified software pattern. Therefore, in these embodiments, the retrieved software pattern can be duplicated prior to further customization in step 239. Once the software pattern to be used for the computer program is selected or duplicated, the method 200 can then repeat steps 210 through 236 to modify the existing software pattern.

Upon reviewing the aforementioned embodiments, it would be evident to one of ordinary skill in the art that the embodiments can be modified, reduced, or enhanced without departing from the scope and spirit of the claims described below. For example, in some embodiments, a software pattern can itself include "sub-patterns". That is, the software pattern can be a collection of individual software patterns configured to operate together, where the overall pattern and the sub-patterns therein each can have their own elements. Therefore, behavioral models can be provided to describe the desired behavior for not only elements of the pattern but for particular ones of the sub-patterns. Furthermore, in the case of behavioral models that extend the functionality of the software pattern, as previously discussed, the development system can not only generate additional elements for the overall pattern and sub-patterns therein, but can also generate additional sub-patterns (and elements therein), for providing the extended functionality. In such embodiments, the development system can be configured to access the template database and the element database to retrieve any templates or elements needed for generating the new sub-patterns. Furthermore, the development system can prompt the user to provide any sub-patterns or elements needed.

Figure 3:
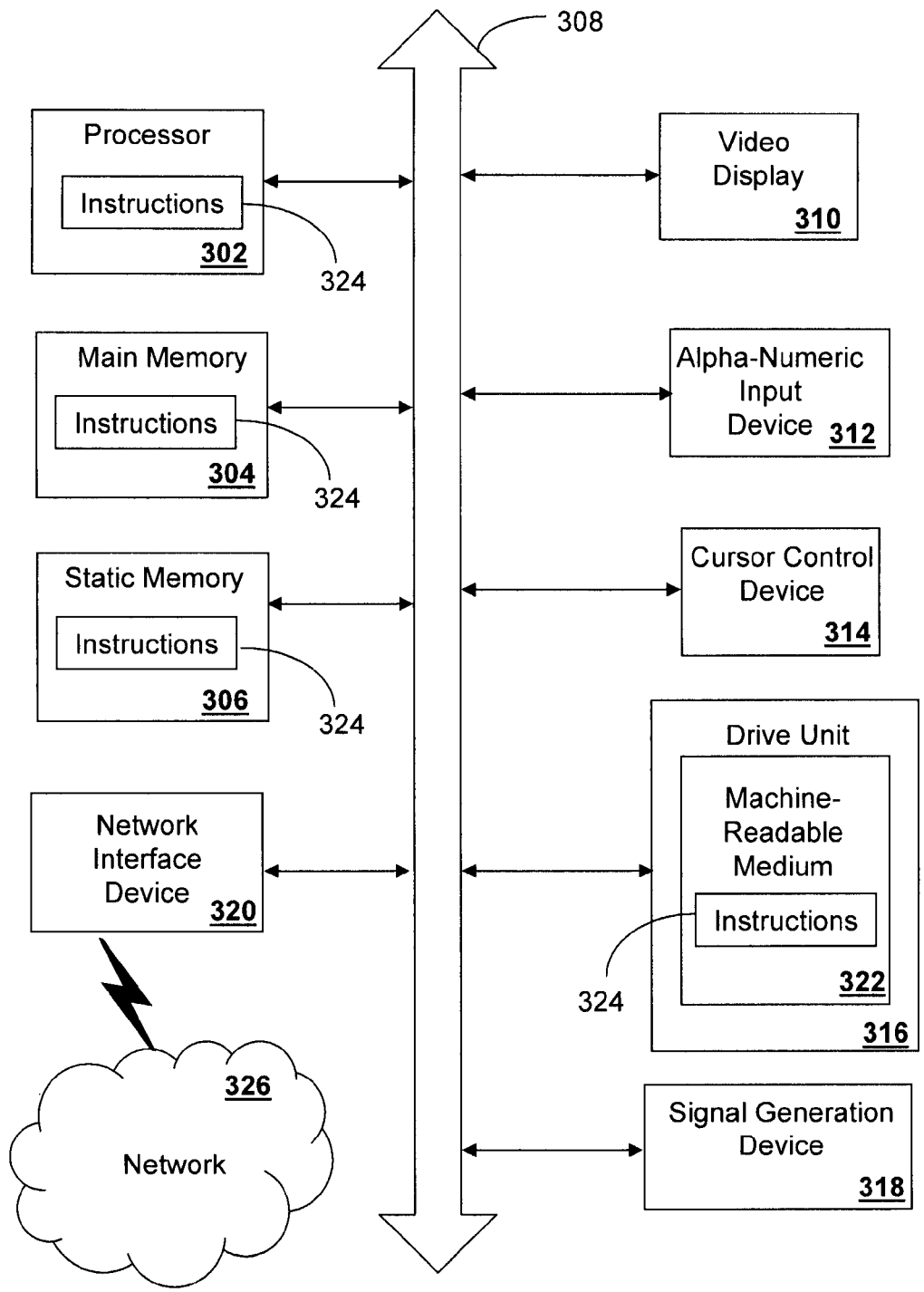
FIG. 3 is a schematic view of a computer system within which a set of instructions operate according to an embodiment of the invention.

FIG. 3 is a schematic diagram of a computer system 300 for executing a set of instructions that, when executed, causes the computer system 300 to perform one or more of the methodologies and procedures described above. In some embodiments, the computer system 300 operates as a standalone device. In other embodiments, the computer system 300 can be connected (e.g., using a network) to other computing devices. In a networked deployment, the computer system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 includes a processor 302 (such as a central processing unit (CPU), a graphics processing unit (GPU, or both), a main memory 304 and a static memory 306, which communicate with each other via a bus 308. The computer system 300 further includes a display unit 310, such as a video display (e.g., a liquid crystal display or LCD), a flat panel, a solid state display, or a cathode ray tube (CRT)). The computer system 300 also includes an input device 312 (e.g., a keyboard), a cursor control device 314 (e.g., a mouse), a disk drive unit 316, a signal generation device 318 (e.g., a speaker or remote control) and a network interface device 320.

The disk drive unit 316 includes a computer-readable storage medium 322 on which is stored one or more sets of instructions 324 (e.g., software code) configured to implement one or more of the methodologies, procedures, or functions described herein. The instructions 324 can also reside, completely or at least partially, within the main memory 304, the static memory 306, and/or within the processor 302 during execution thereof by the computer system 300. The main memory 304 and the processor 302 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

Those skilled in the art will appreciate that the computer system architecture illustrated in FIG. 3 is one possible example of a computer system. However, the invention is not limited in this regard and any other suitable computer system architecture can also be used without limitation.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network interface device 320.

While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for modifying software patterns in software development, comprising:
 selecting, by an electronic circuit, a pre-defined software pattern, said pre-defined software pattern having one or more pre-defined elements;
 identifying, by said electronic circuit, one or more of said pre-defined elements to be modified;

obtaining, by said electronic circuit, one or more behavioral models, each of said behavioral models specifying a functional behavior for at least one of said identified elements;

ascertaining, by said electronic circuit, a modification required for each of said identified elements to provide said specified functional behavior; and incorporating, by said electronic circuit, said modification into an instance of said pre-defined software pattern to generate a modified software pattern.

2. The method of claim 1, wherein said incorporating further comprises generating a replacement element for at least one of said identified elements in said pre-defined software pattern.

3. The method of claim 1, wherein said incorporating further comprises modifying a portion of one of said identified elements in said pre-defined software pattern.

4. The method of claim 1, wherein said ascertaining further comprises:
   determining an additional element required by said behavioral model;
   generating said additional element; and
   including said additional element in said required modification.

5. The method of claim 1, wherein said obtaining further comprises retrieving at least one of a plurality of pre-defined models for at least one of said identified elements.

6. The method of claim 1, wherein said obtaining further comprises prompting a user to generate a new behavioral model for at least one of said identified elements.

7. The method of claim 1, further comprising:
   generating a duplicate of said modified software pattern;
   obtaining a new behavioral model, said new behavioral model specifying a new functional behavior for at least one existing element in said duplicate software pattern;
   ascertaining a second modification required for said at least one existing element; and
   incorporating said second modification into said duplicate modified software pattern.

8. A system for developing computer programs, comprising:
   at least one storage element configured for storing a pre-defined software pattern, said pre-defined software pattern having one or more pre-defined elements; and
   at least one a processing element configured for identifying one or more of said pre-defined elements to be modified, obtaining one or more behavioral models, each of said behavioral models specifying a functional behavior for at least one of said identified elements, ascertaining a modification required for each of said identified elements to provide said specified functional behavior, and incorporating said modification into an instance of said pre-defined software pattern to generate a modified software pattern.

9. The system of claim 8, wherein said processing element is further configured to generate a replacement element for at least one of said identified elements in said pre-defined software pattern during said incorporating.

10. The system of claim 8, wherein said processing element is further configured to modify at least one portion of one said identified elements in said pre-defined software pattern during said incorporating.

11. The system of claim 8, wherein said processing element is further configured to determine an additional element required by said behavioral model, generate said additional element, and include said additional element in said required modification.

12. The system of claim 8, wherein said processing element is further configured to retrieve at least one of a plurality of pre-defined models associated with said identified elements.

13. The system of claim 8, wherein said processing element is further configured to prompt a user to generate a new behavioral model for at least one of said identified elements.

14. The system of claim 8, wherein said processing element is further configured to generate a duplicate of said modified software pattern, obtain a new behavioral model, said new behavioral model specifying a new functional behavior for at least one existing element in said duplicate software pattern, ascertain a second modification required for said at least one existing element; and incorporate said second modification into said duplicate modified software pattern.

15. A non-transitory computer-readable storage medium, having stored thereon a computer program for software development, the computer program having a plurality of code sections, the code sections executable by a computer to cause the computer to perform the steps of:
   selecting a pre-defined software pattern, said pre-defined software pattern having one or more pre-defined elements;
   identifying one or more of said pre-defined elements to be modified;
   obtaining one or more behavioral models, each of said behavioral models specifying a functional behavior for at least one of said identified elements;
   ascertaining a modification required for each of said identified elements to provide said specified functional behavior; and
   incorporating said modification into an instance of said pre-defined software pattern to generate a modified software pattern.

16. The computer-readable storage medium of claim 15, wherein said incorporating further comprises generating a replacement element for at least one of said identified elements in said pre-defined software pattern.

17. The computer-readable storage medium of claim 15, wherein said incorporating further comprises modifying a portion of one of said identified elements in said pre-defined software pattern.

18. The computer-readable storage medium of claim 15, further comprising code sections for:
   determining an additional element required by said behavioral model;
   generating said additional element; and
   including said additional element in said required modification.

19. The computer-readable storage medium of claim 15, wherein said obtaining further comprises retrieving at least one of a plurality of pre-defined models for at least one of said identified elements.

20. The computer-readable storage medium of claim 15, wherein said obtaining further comprises prompting a user to generate a new behavioral model for at least one of said identified elements.

* * * * *